United States Patent [19]

Johnson et al.

[11] 4,367,884
[45] Jan. 11, 1983

[54] REMOVABLE GOOSENECK FOR TRAILERS

[76] Inventors: Howard L. Johnson, 7500 NW. 108th St., Kansas City, Mo. 64154; David A. Kramer, 3101 Sante Fe, Independence, Mo. 64055

[21] Appl. No.: 216,511

[22] Filed: Dec. 15, 1980

[51] Int. Cl.³ .............................................. B62D 53/06
[52] U.S. Cl. ............................. 280/423 B; 280/425 A
[58] Field of Search ....................... 280/423 B, 425 A

[56] References Cited

U.S. PATENT DOCUMENTS

| | | | |
|---|---|---|---|
| 2,590,181 | 3/1952 | Keesler | 280/423 B |
| 2,590,210 | 3/1952 | Rodgers | 280/423 B |
| 2,605,916 | 8/1952 | Martin | 280/423 B |
| 2,687,225 | 8/1954 | Martin | 280/423 B |
| 2,772,008 | 11/1956 | Martin | 280/423 B |
| 2,774,497 | 12/1956 | Martin | 280/423 B |
| 2,878,033 | 3/1959 | Polich | 280/423 B |
| 2,895,746 | 7/1959 | Swaney | 280/423 B |
| 2,953,396 | 9/1960 | Meadows | 280/423 B |
| 2,967,720 | 1/1961 | Smith et al. | 280/425 A |
| 2,968,412 | 1/1961 | Hill | 280/423 B |
| 2,978,128 | 5/1961 | Polich | 280/423 B |
| 3,027,030 | 3/1962 | Duffy | 280/423 B |
| 3,041,087 | 6/1962 | Talbert | 280/425 A |
| 3,215,449 | 11/1965 | Talbert | 280/425 A |
| 3,326,572 | 6/1967 | Murray | 280/423 B |
| 3,419,169 | 12/1968 | James | 280/425 A |
| 3,517,945 | 6/1970 | Fikse | 280/425 A |
| 3,536,340 | 10/1970 | Talbert | 280/425 A |
| 3,632,139 | 1/1972 | Stafford, Jr. | 280/425 A |
| 3,698,582 | 10/1972 | Weinmann | 280/425 A |
| 3,756,443 | 9/1973 | Verschage | 280/423 B |
| 3,866,947 | 2/1975 | Yakubow | 280/425 A |
| 3,883,019 | 5/1975 | Hansen | 280/425 A |
| 3,894,645 | 7/1975 | Verschage | 280/425 A |
| 4,078,684 | 3/1978 | Hasenberg | 280/423 B |
| 4,103,793 | 8/1978 | Weaver | 280/423 B |
| 4,164,297 | 8/1979 | Dorwin | 280/423 B |
| 4,219,211 | 8/1980 | Sauers | 280/425 A |

FOREIGN PATENT DOCUMENTS 1583861 2/1981 United Kingdom ............ 280/423 B

Primary Examiner—Joseph F. Peters, Jr.
Assistant Examiner—Ross Weaver
Attorney, Agent, or Firm—Litman, Day and McMahon

[57] ABSTRACT

A removable gooseneck for detachably connecting a tractor and trailer utilizes an elongate beam member attached to the hitch of the tractor and having an upstanding frame member depending from a rear end of the beam member. A foot is pivotally mounted at a lower end of the upstanding frame member for engagement with a front end portion of the trailer. A guide pin and link arrangement detachably connects the foot at a front end to the trailer and a locking pin and bushing arrangement detachably connects the rear end of the foot to the trailer at a location spaced from the guide pin and link arrangement. A power fluid ram extends between an upper portion of the upstanding frame member and the foot to selectively cause the foot member to swing upwardly and tilt the trailer downwardly for detachment of the gooseneck from the trailer and swing the foot downwardly to tilt the trailer upwardly for drafting.

1 Claim, 7 Drawing Figures

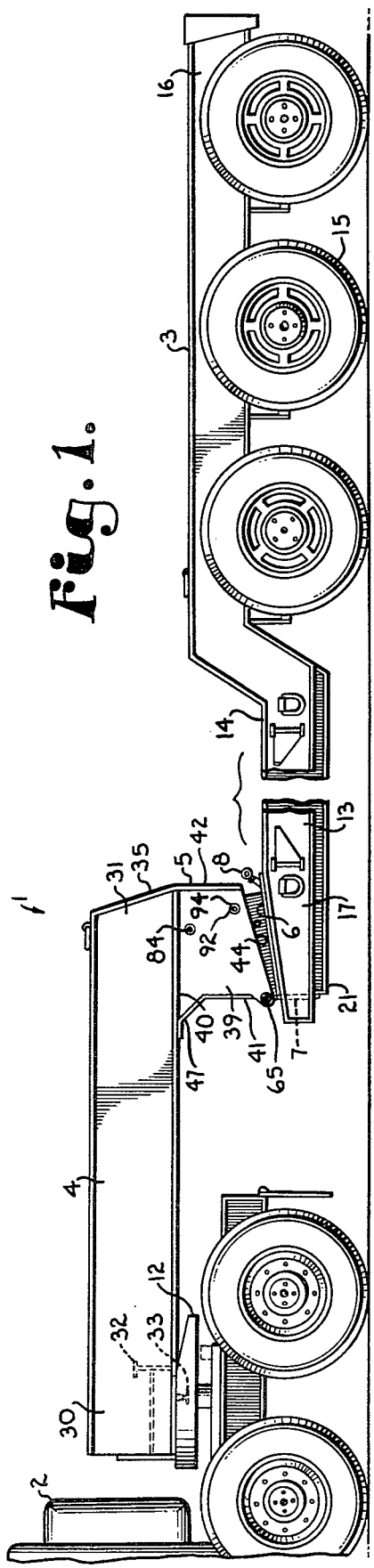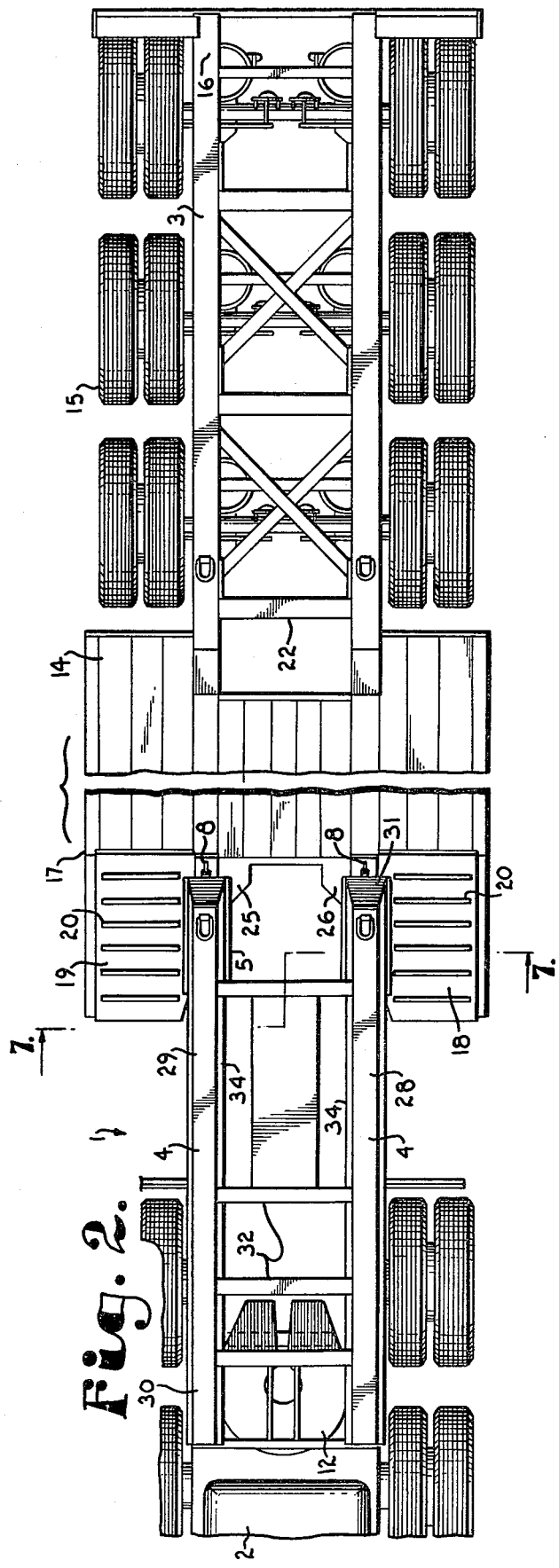

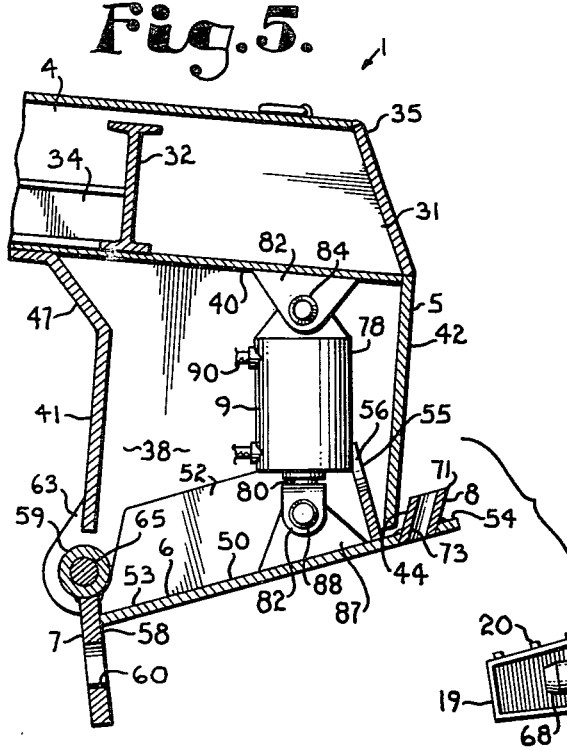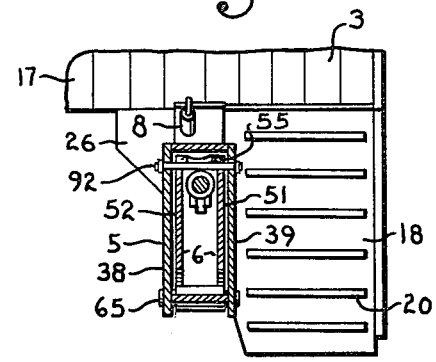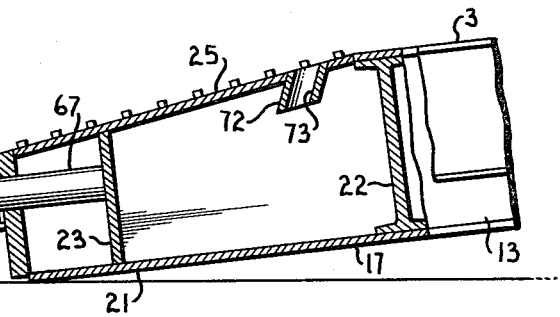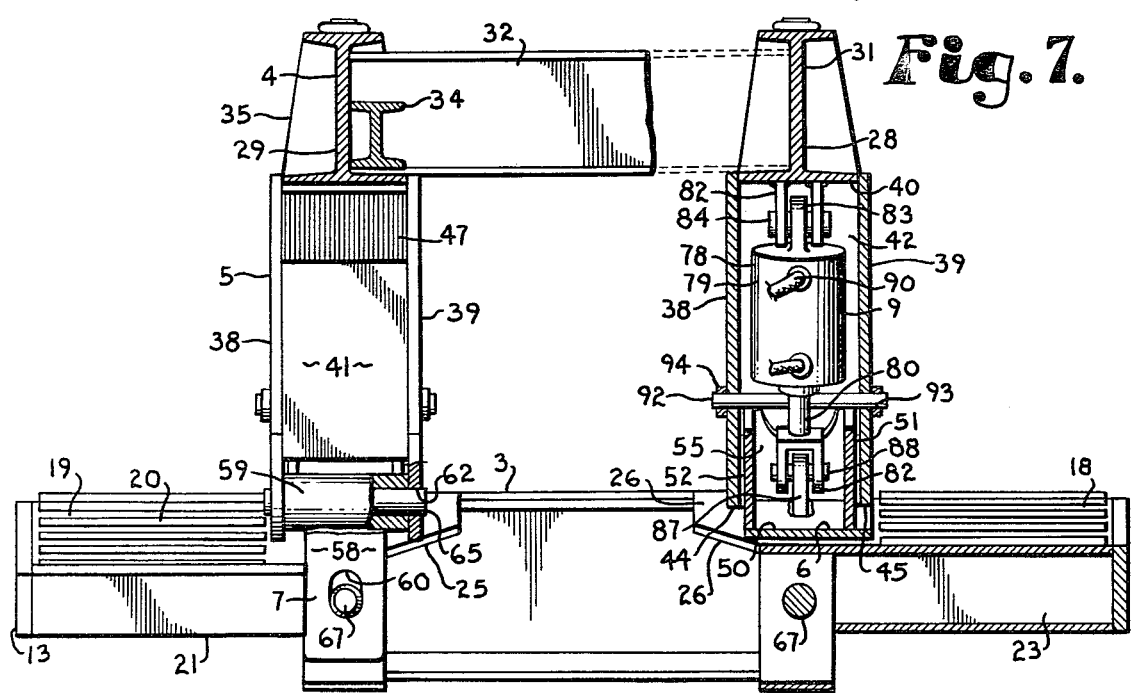

REMOVABLE GOOSENECK FOR TRAILERS

This invention relates to gooseneck trailers, and in particular, to a gooseneck which is detachable from the trailer body.

Trailers for carrying heavy vehicles are typically of the "low boy" type having a platform supported on rear wheels which project above the level of the platform, thereby providing a lowered center of gravity for vehicles carried thereon. Heavy machinery construction vehicles and military equipment such as bulldozers, steamrollers, armored tanks are normally carried on such "low boy" tractors. Such trailers are towed by conventional tractors having a fifth wheel hitch and a connection means known as a gooseneck connecting the tractor with the trailer. The gooseneck usually comprises an upstanding, generally vertical section secured, either releasably or pivotally, to the front porrtion of the trailer and a generally horizontal beam secured to the upper portion of the upstanding section and extending forwardly to attach to the the tractor fifth wheel.

To load or unload heavy equipment from the trailer platform, the trailer is lowered as close as possible to the ground. In one form of gooseneck, the gooseneck is detached from the tractor and swung downwardly to engage the ground and the equipment unloaded. In another form of gooseneck, the gooseneck is removed from the trailer and the equipment unloaded from the trailer platform.

Many such goosenecks of the detachable type are difficult to operate in order to engage and disengage with the trailer and moreover, employ complex latching arrangements utilizing multiple rams, levers and the like.

The principle objects of the present invention are: to provide a detachable gooseneck structure able to withstand heavy loads; to provide such a gooseneck structure which is easily connected and disconnected from a trailer; to provide such a gooseneck structure which is easily aligned and fastened to coordinating portions of a trailer; to provide such a gooseneck structure which employs few moving parts and does not necessitate frequent adjustment of linkages and the like; to provide such a gooseneck structure utilizing sufficient principles of mechanical advantage to cause a trailer end portion to be swung upwardly and affixed in rigid connecting relationship to tractor and raised from ground engagement; to provide such a gooseneck structure having a foot member which engages a front end portion of a trailer and has engagement means at opposite ends thereof to permit the trailer front end to be lifted upwardly; to provide such a gooseneck structure having a power ram connected to the foot member to cause same to swing downwardly with respect to upper portions of the gooseneck structure and thereby raise the gooseneck structure and the front end of the trailer; and to provide such a gooseneck structure which is relatively inexpensive, sturdy and efficient in use and particularly well adapted for the intended purpose.

Other objects and advantages of this invention will become apparent from the description taken in connection with the accompanying drawings wherein is set forth, by way of illustration and example, a certain embodiment of this invention.

FIG. 1 is a fragmentary side elevational view of a tractor connected to a trailer by a gooseneck structure embodying the present invention.

FIG. 2 is a fragmentary plan view of the tractor trailer and gooseneck structure shown in FIG. 1.

FIG. 5 is an enlarged fragmentary elevational view of the gooseneck structure in disconnected relationship from a trailer front end.

FIG. 6 is a top sectional view taken along lines 6—6, FIG. 3, and shown somewhat smaller for purposes of illustration.

FIG. 7 is a sectional view taken along lines 7—7, FIG. 2.

Figure 3:
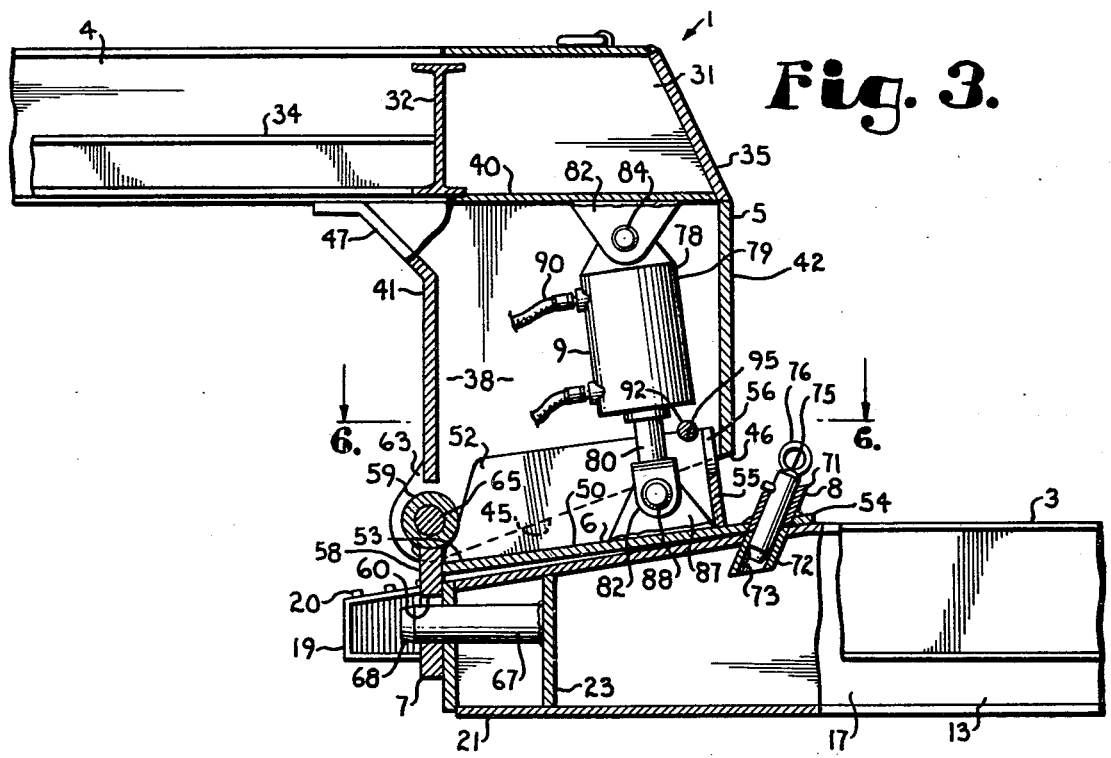
FIG. 3 is an enlarged, fragmentary elevational view of the gooseneck structure and showing same in a raised position.
Figure 4:
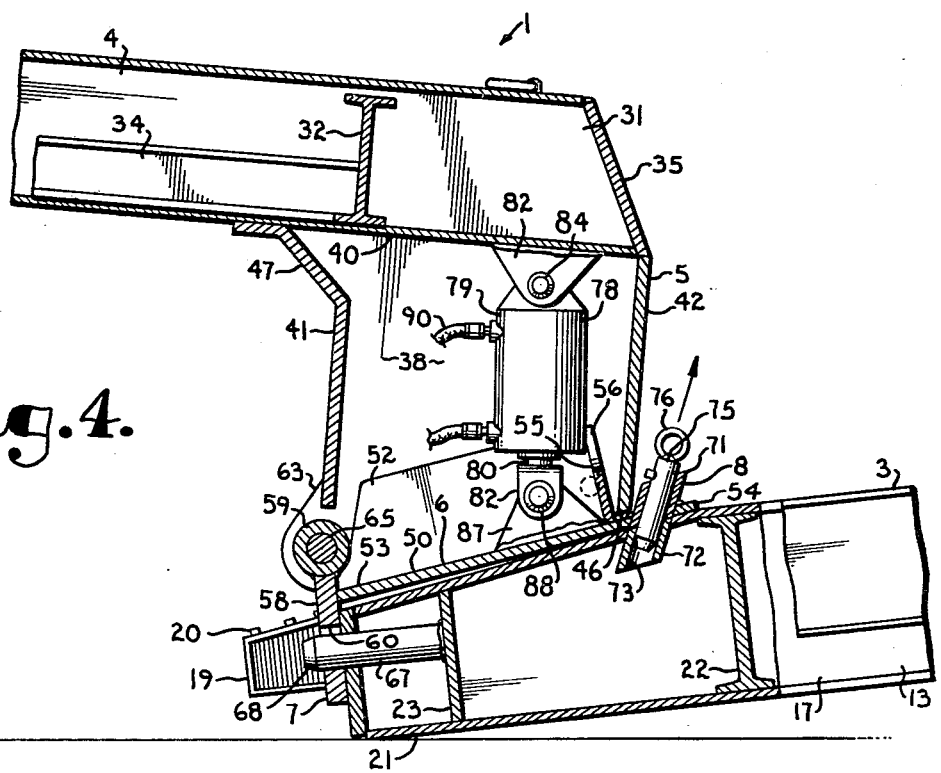
FIG. 4 is a fragmentary elevational view of the gooseneck structure and showing same in a lowered position.

As required, a detailed embodiment of the present invention is disclosed herein, however, it is to be understood that the disclosed embodiment is merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally indicates a gooseneck structure embodying the present invention and shown in FIG. 1, in connected relationship between a tractor 2 and a trailer 3. The gooseneck structure 1 includes an elongate beam member 4 extending rearwardly from the tractor 2 and having an upstanding frame member 5 affixed to and depending from the rear end thereof. A foot member 6 is pivotally mounted to a bottom portion of the frame member 5 and has first and second engagement means 7 and 8 respectively connecting the foot member 6 at opposite ends thereof to coordinating engagement portions on the front end of the trailer 3. An extension and retraction means 9 extends between upper portions of the frame member 5 and the foot member 6 and causes the foot member 6 to move upwardly and downwardly for tilting the trailer upwardly for drafting in response to movement of the extension and retraction means 9 in one direction and tilting the trailer downwardly for detachment of the first and second engagement means 7 and 8 in response to movement of the extension and retraction means 9 in the other direction.

In the illustrated example, the tractor 2 is preferably of conventional construction with a hitch such as a fifth wheel 12 mounted upon a rear portion thereof. The fifth wheel hitch, as is conventional, is constructed so that the rear portion thereof may pivot downwardly to facilitate connection of trailers and the like. The trailer 3 is preferably of the "low boy" type and has opposite side beams 13 supporting a load bearing platform 14 and a plurality of tandem wheels 15 located at a rear end portion 16 of the trailer 3. The front end portion 17 of the trailer includes spaced ramps 18 and 19 having a plurality of transverse ribs 20 thereon to provide a non-slip surface for a vehicle to be carried on the trailer 3. The side beams 13 include tapered ends adjacent the front end portion 17 to provide a ramp surface and have lower surfaces 21 for resting upon a ground surface. A plurality of lateral beam members 22, including a front lateral beam 23, extend between the side beams 13 for structural rigidity.

The front end portion 17 includes spaced plate portions 25 and 26 adapted for engagement with the gooseneck structure foot member 6 as described below. In the illustrated example, the plate portions 25 and 26 are inclined and adjoin the ramps 18 and 19.

In the illustrated example, FIG. 2, the beam member 4 includes two separate units thereof, units 28 and 29, each including respective frame members 5, foot members 6, first and second engagement means 8 and 9, extension and retraction means 9 and further components thereof as described below. Each of the beam member units 28 and 29 includes an elongate, generally horizontal extending I-beam having a forward portion 30 and a rearward portion 31 which, in the illustrated example, is inclined upwardly. A plurality of transverse connecting beams 32 extend between the I-beams of the beam member units 28 and 29 to provide structural rigidity. Connecting beams 32 located in the beam member forward portion 30 provide a mounting arrangement for a pin 33 engagable with the tractor fifth wheel hitch 12. Also providing structural rigidity between the beam member units 28 and 29 are longitudinally extending beams 34 secured at opposite ends to the transverse connecting beams 32. An inclined end plate 35 is affixed to the rearward portion 31 of each of the beam member units 28 and 29.

Each of the beam member units 28 and 29 include a frame member 5 depending from the rearward portions 31 thereof. In the illustrated example, FIGS. 3 through 7, each frame member 5 has opposite side walls 38 and 39 affixed at upper edges to the side margins of the I-beam bottom flange 40. Front and rear walls 41 and 42 also extend downwardly from the beam member 4 and are affixed thereto, as by welding, to form an enclosure having an open bottom portion inclined upwardly along bottom margins 45 of the side walls 38 and 39 and the bottom portion 46 of the rear wall 42. Upper portions of the front wall 41 are angled forwardly, as at 47, for structural strength.

The foot member 6 is located generally within the open bottom portion 44 of the frame member 5 and is pivotally mounted or hinged thereto for swinging upwardly and downwardly. In the illustrated example, the foot member 6 includes a bottom plate portion 50 with opposite side walls 51 and 52 affixed perpendicularly thereto, as by welding or the like. The foot member 6 has front and rear end portions 53 and 54 with the front end portion 53 generally located in vertically aligned relationship with the front wall 41 and the rear end portion 54 projecting beyond the rear wall 42 to form a tongue. A rear wall 55 extends between rear margins of the side walls 51 and 52 intermediately of the front and rear end portions 53 and 54 in position to be received within the enclosure of the frame member 5. The rear wall 55 includes a semi-circular recess 56 for clearance of the extension retraction means 9 as described below.

The front end portion 53 is secured, as by welding, to a link 58 which forms a portion of the first engagement means 7. The link 58 extends upwardly and joins a pivot bushing 59 extending transversely between the frame member side walls 38 and 39. A lower portion of the link 58 extends downwardly from the juncture of the link with the bottom plate portion 50 and has an aperture 60 extending therethrough. The pivot bushing 59 aligns with respective, spaced apertures 62, FIG. 7, in forwardly protruding portions 63 of the side walls 38 and 39 for receipt of a pivot pin 65 therethrough for upward and downward swinging movement of the foot member 6 relative to the frame member 5.

The first and second engagement means 7 and 8 include coordinating engagement portions respectively located adjacent the foot member front and rear end portions 53 and 54 at longitudinally spaced locations on the front end portion 17 of the trailer 3. In the illustrated example, the first engagement means 7 is associated with the front end portions 53 and includes the link 58 and a guide pin 67 projecting forwardly from the front lateral beam 23. The guide pin 67 includes a chamfered tip 68 for ease of sliding into the link aperture 60. As shown in connection and disconnection sequence in FIGS. 3, 4 and 5, the first engagement means is disengaged and engaged by longitudinal movement of the gooseneck structure 5 with respect to the trailer 3 whereby the guide pin 67 slides into and out of engagement with the link 58. When engaged, the link 58 provides an upward pull on the guide pin 67 or tension force, between the front end portion 53 of the foot member 6 with ultimate foot end of the trailer 3.

The second engagement means 8 is associated with the rear end portion or tongue 54 of the foot member 6 and includes aligned and inclined bushing sections 71 and 72 respectively extending through the rear end portion or tongue 54 and the trailer plate portions 25 and 26. The bushing sections 71 and 72 include a through bore 73 for receipt of a locking pin 75. In the illustrated example, the locking pin 75 has a manual pull ring 76 on an end thereof. The bushing sections 71 and 72 have an angle of inclination inclined upwardly from front to rear so that, when the locking pin 75 is inserted into the aligned bores 73, the foot member 6 is prevented from disengagement with the respective trailer plate portion 25 or 26.

When the first and second engagement means 7 and 8 are in an engaged relationship, FIG. 3, and the gooseneck raised for drafting, a tension force is applied at a first location coincident with the first engagement means 7 and a compression force is applied at a second location longitudinally spaced from the first location and coincident with the second engagement means 8, thereby securely locking the gooseneck structure 1 through the foot member 6 to the trailer 3. As aforestated, the trailer plate portions 25 and 26 are inclined, as is the open bottom portion 44 of the frame member 5. The bottom plate portion 50 of the foot member 6, when engaged with the respective plate portion 25 or 26 of the trailer 3, is substantially in planar engagement therewith, FIGS. 3 and 4. Depending upon the angle of inclination of the foot member 6 relative to the frame member 5, the trailer 3 can be supported above a ground surface for drafting, FIG. 3, or laid upon the ground surface, FIG. 4, for disconnection of the first and second engagement means 7 and 8 and coupling or disengagement of the gooseneck structure 1 from the trailer 3, FIG. 5.

To accomplish upward and downward rotating movement of the foot member 6 relative to the frame member 5 and the beam member 4, the extension and retraction means 9 is provided to extend between the frame member upper end and the foot member 6 and permit relative swinging movement in a vertical plane. In the illustrated example, the extension and retraction means 9 includes a power fluid ram 78 including a cylinder 79 having an extensible and retractible piston 80.

Spaced ears 82, affixed as by welding to the bottom surface of the I-beam flange 40, receive an ear 83 affixed to the cylinder 79. A pivot pin 84 extends through the aligned ears 82 and 83 and swingably mounts the upper portion of the ram 78 to the beam member 4.

Similarly, the lower end of the piston 80 has a clevis 86 fitted thereto that receives an ear 87 affixed, as by welding, to the bottom plate portion 50 of the foot member 6. A pivot pin 88 swingably connects the clevis 86 to the ear 87. Thus, extension of the power fluid ram 78 causes the foot member 6 to swing outwardly from the frame member 5 and push upwardly upon the beam member 4 which reacts by swinging upwardly and carrying the front end portion 17 of the trailer 3 therewith upwardly to above the ground level. Extension of the ram 78 may be continued to raise the trailer 3 until the pivot limit of the fifth wheel hitch restricts further rotation. Conversely, retraction of the ram 78 causes downward swinging movement of the beam member 4 to cause tilting of the trailer front end portion 17 until the same rests upon the ground.

Preferably, the power fluid ram 78 utilizes hydraulic oil fluid provided under pressure from a pump (not shown) associated with the gooseneck structure 1 and connected thereto by appropriate conduits 90.

A power fluid supply means (not shown) can be mounted either on the gooseneck structure 1, the tractor 2, or the trailer 3 and powered by a combustion engine or by an electrical motor driven by storage batteries supplied therewith pursuant to the requirements of the operator. Moreover, the operator can further utilize the hydraulic power fluid supply associated with the gooseneck structure 1 for powering various auxilliary equipment such as winches and other force applying rams.

The use of a hydraulic oil power fluid system provides the advantage of being able to effectively lock the fluid under pressure into the various force applying rams for maintaining a set position of the gooseneck structure 1 relative to the trailer 3. This feature is in distinction to those systems powered by pneumatic means wherein air pressure tends to bleed off when, for example, the gooseneck and trailer are uncoupled from the tractor and the gooseneck slowly collapses to the ground.

To provide a safety stop against inadvertent collapsing, or retraction of the foot member 7 into frame member 5 when the trailer is raised to a normal ride height, FIG. 1, the gooseneck structure 1 includes a stop pin 92 selectively extending between the foot member 6 and the frame member 5. In the illustrated example, the stop pin 92 extends through aligned apertures 93 in the side walls 38 and 39 that are strengthened by collars 94, FIG. 7. Semi-circular recesses 95 in the foot member opposite sidewalls 51 and 52 accomodate the stop pin 93 when the foot member 6 is swung downwardly for lifting the trailer front end and relieve static loading upon the ram 78 while drafting. The stop pin 93 is selectively inserted and removed by the operator.

Preferably, the stop pin 92 is inserted into the frame member 5 after the trailer 3 is raised to a normal ride height. After emplacement of the stop pin 92, the trailer 3 can be further raised to increase the clearance of the trailer front end portion 17 from the ground for traveling over obstacles such as humps, railroad crossings, low dips, and the like. To cause further upward movement, pressurized fluid is again directed to each ram 78 to swing the foot member 6 even more downwardly. Should fluid system pressure be inadvertently lost during this procedure, the foot member 6 retracts into the frame member 5 only until encountering the stop pin 92 whereby the trailer 3 is maintained in the normal ride height. Thus, the trailer 3 remains draftable until repairs can be accomplished at a suitable location.

In the use of the gooseneck structure 1, the driver of the tractor 2 maneuvers the tractor into longitudinal alignment with the trailer 3 and slowly backs until the guide pin 67 is received within the aperture 60 of the link 58. The locking pin 75 is then manually inserted through the aligned bores 73 to lock the foot member 6 to the trailer 3. The operator then manipulates appropriate power fluid control means (not shown) to cause the power fluid ram 78 to extend and swing the foot member 6 downwardly to cause the beam member 4 and the trailer front end portion 17 to swing upwardly to a position for drafting. Upon retraction of the fluid control means to retract the power fluid ram 78, the trailer front end portion 17 tilts downwardly until the lower surfaces 21 are supported upon the earth. The locking pin 75 is pulled from the aligned bores 73 and the tractor is driven forwardly relative to the trailer 3 to disengage the link 58 from the guide pin 67. A vehicle or other heavy load carried on the trailer 3 may then be unloaded.

It is to be understood that while one form of this invention has been illustrated and described, it is not to be limited to specific form or arrangement of parts herein described and shown, except insofar as such limitations are included in the following claims.

What is claimed and desired to secure by Letters Patent is:

1. A gooseneck structure detachably connecting a tractor and trailer, said trailer including an inclined front portion adapted for engagement with said gooseneck structure, said gooseneck structure comprising:
  (a) an elongate, generally horizontally extending beam member having forward and rearward portions with said forward portion including means for connection to a fifth wheel of said tractor;
  (b) an upstanding frame member having front, rear and opposite side walls, top and bottom portions, and providing an enclosure; said top portions affixed to rearward portions of said beam member so that said frame member depends therefrom with said bottom portions positioned adjacent said trailer, said frame member rear wall having a lower edge portion; said frame member side walls having aligned apertures therethrough;
  (c) a foot member comprising a substantially vertically oriented planar member located at said bottom portions and having front and rear end portions, said foot having upwardly extending side walls oriented substantially parallel with said frame member side walls, said foot side walls including a notch on an upper edge thereof near a rear portion thereof, said notches and frame member side wall apertures alignable;
  (d) a pivot connecting said foot member front end portion to said frame member adjacent said front walls and providing vertical pivoting movement of said foot member relative to said frame member, said rear portion extending past said frame member rear wall;
  (e) coordinating guide pin and link means detachably connecting said front end portion to said trailer at a first location;
  (f) coordinating locking pin and bushing means positively locking and detachably connecting said rear end portion to said trailer at a second location spaced longitudinally from said first location for preventing vertical separation of said rear end portion from said trailer;

(g) a power fluid ram having upper and lower ends respectively pivotally connected to said foot member at a position between said front and rear end portions and to said beam member between said front and rear walls and within said enclosure; whereby said ram is retractable to swing said foot member upwardly and tilt said trailer downwardly for detachment of said foot member therefrom and extensible to swing said foot member downwardly and tilt said trailer upwardly for drafting, said foot member rear portion pivoting into a position adjacent said rear wall edge when said ram is retracted;

(h) a removable stop pin extending between said frame member and said foot member for limiting upward swinging of said foot member and downward tilting of said trailer, said pin selectively and manually insertable through said frame member side wall apertures and engageable with said foot side wall notches when said foot member is in a position for drafting thereby retaining said trailer at a desired ride height for drafting without usage of hydraulic rams; and (i) said frame member rear wall edge engageable with said foot member rear end portion when said power ram is retracted, said frame member rear wall edge comprising a stop member limiting the upward pivoting movement of said foot thereby orienting said foot member in an inclined position commensurate with the trailer front portion inclined portion for attachment thereto.

* * * * *